US008330968B2

(12) United States Patent
Miyata (10) Patent No.: US 8,330,968 B2
(45) Date of Patent: Dec. 11, 2012

(54) PRINT CONTROL SYSTEM, AND PRINTER AND COMPUTER READABLE MEDIUM THEREFOR (75) Inventor: Yuji Miyata, Aichi (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 732 days.

(21) Appl. No.: 12/021,660

(22) Filed: Jan. 29, 2008

(65) Prior Publication Data
US 2008/0180741 A1 Jul. 31, 2008

(30) Foreign Application Priority Data
Jan. 29, 2007 (JP) ................. 2007-018403

(51) Int. Cl.
G06F 3/12 (2006.01)
(52) U.S. Cl. ...... 358/1.13; 358/1.1; 358/1.15; 358/1.16; 719/321; 719/322; 719/327
(58) Field of Classification Search .......... None
See application file for complete search history.

(56) References Cited

U.S. PATENT DOCUMENTS

| 6,661,530 | B1 * | 12/2003 | Munetomo et al. | 358/1.15 |
|---|---|---|---|---|
| 7,436,532 | B2 * | 10/2008 | Tsujimoto | 358/1.15 |
| 7,728,992 | B2 * | 6/2010 | Yamamoto et al. | 358/1.13 |
| 2003/0079063 | A1 * | 4/2003 | Iida et al. | 710/8 |
| 2003/0202010 | A1 * | 10/2003 | Kerby et al. | 345/744 |
| 2004/0125395 | A1 | 7/2004 | Onishi | |
| 2004/0168116 | A1 * | 8/2004 | Shikata | 715/500 |
| 2006/0017955 | A1 * | 1/2006 | Owen et al. | 358/1.13 |
| 2007/0005561 | A1 | 1/2007 | Sakura et al. | |

FOREIGN PATENT DOCUMENTS

| JP | 10-138555 | | 5/1998 |
|---|---|---|---|
| JP | 2000-066849 | A | 3/2000 |
| JP | 2000-227847 | A | 8/2000 |
| JP | 2002-328798 | | 11/2002 |
| JP | 2003-150339 | | 5/2003 |
| JP | 2003-305923 | A | 10/2003 |
| JP | 2004-192151 | A | 7/2004 |
| JP | 2004-199292 | A | 7/2004 |
| JP | 2006-004357 | | 1/2006 |
| JP | 2007-011576 | A | 1/2007 |

OTHER PUBLICATIONS

JP Office Action dtd Dec. 9, 2008, JP Appln. 2007-018403.
JP Office Action dtd Jun. 30, 2009, JP Appln. 2007-018403.

* cited by examiner

Primary Examiner — Marivelisse Santiago Cordero
Assistant Examiner — Miya J Cato
(74) Attorney, Agent, or Firm — Banner & Witcoff, Ltd.

(57) ABSTRACT

A print control system includes a computer with application software and a printer driver installed thereinto, a printer, which is connected with the computer, configured to perform a printing operation based on print settings including a setting item configurable via the application software and the printer driver, a judging unit configured to judge whether a first setting value of the setting item configured via one of the application software and the printer driver is equivalent to a second setting value of the setting item configured via the printer driver, and a warning unit configured to issue a warning when the judgment by the judging unit is negative.

12 Claims, 8 Drawing Sheets

| AREA | SETTING ITEM | SETTING VALUE |
| --- | --- | --- |
| PUBLIC SETTING AREA | PAPER SIZE | A4 |
| | COLOR MODE | FULL COLOR |
| | RESOLUTION | 600 dpi |
| PRIVATE SETTING AREA | PAPER SIZE | A4 |
| | COLOR MODE | MONOCHROME |
| | RESOLUTION | 600 dpi |
| | MULTIPLE PAGE | 2 in 1 |

| SETTING ITEM | MONITORABLE/NON-MONITORABLE | MONITOR ON/OFF |
|---|---|---|
| PAPER SIZE | MONITORABLE | OFF |
| COLOR MODE | MONITORABLE | ON |
| RESOLUTION | MONITORABLE | ON |
| MULTIPLE PAGE | NON-MONITORABLE | |

PRINT CONTROL SYSTEM, AND PRINTER AND COMPUTER READABLE MEDIUM THEREFOR

CROSS-REFERENCE TO RELATED APPLICATION

This application claims priority under 35 U.S.C. §119 from Japanese Patent Application No. 2007-018403 filed on Jan. 29, 2007. The entire subject matter of the application is incorporated herein by reference.

BACKGROUND

1. Technical Field

The following description relates to one or more print control systems, and printers and computer readable media therefor.

2. Related Art

In general, most of printers to be used in a state connected with a computer are used with a printer driver being installed into the computer. For example, print settings for setting a size of a recording medium (recording paper) and/or a print resolution, and/or an operation of converting image data to PDL data are performed via the printer driver. Then, the image data are transmitted from the computer to the printer, and the printer prints images on the recording medium based on the received image data.

However, among the print settings, for instance, setting items such as the size of the recording medium and the print resolution can be updated via application software such as a word processor without booting the printer driver.

Therefore, a printing operation might actually be implemented even though a user does not know the print settings have been updated via the application software and wrongly assumes the printing operation will be carried out with the print settings configured via the printer driver.

On the contrary, for example, Japanese Patent Provisional Publication No. 2002-328798 (hereinafter, referred to as '798 Publication) discloses a technique in which, only when a combination of the print settings by the application software and the print settings by the printer driver is judged to be improper, the user is warned of it.

SUMMARY

However, in the technique disclosed in the '798 Publication, as described above, only when the combination of the print settings by the application software and the print settings by the printer driver is judged to be improper, the user is warned of it. More specifically, only when print settings for a color matching operation are about to be updated via the application software in a state where the print settings for the color matching operation configured via the printer driver are active, the user is warned of it. Hence, when the combination of the print settings updated via the application software and the print settings configured via the printer driver is not judged to be improper, the printing operation is performed without warning the user.

Therefore, the technique disclosed in the '798 Publication cannot solve the aforementioned problem that the printing operation might actually be implemented even though the user does not know the print settings have been updated via the application software and wrongly assumes the printing operation will be carried out with the print settings configured via the printer driver.

Aspects of the present invention are advantageous in that there can be provided one or more improved print control systems, and printers and computer readable media therefor that can prevent a printing operation from being performed although a user does not know print settings have been updated via application software and wrongly assumes the printing operation will be performed with the print settings configured via a printer driver.

According to aspects of the present invention, there is provided a print control system, which includes a computer with application software and a printer driver installed thereinto, a printer, which is connected with the computer, configured to perform a printing operation based on print settings including a setting item configurable via the application software and the printer driver, and a warning unit configured to issue a warning when a setting value of the setting item configured via the application software is different from a setting value of the setting item configured via the printer driver.

According to another aspect of the present invention, there is provided a printer configured to be connectable with a computer into which application software and a printer driver installed, and to perform a printing operation based on print settings including a setting item configurable via the application software and the printer driver, the printer comprising a warning unit configured to issue a warning when a setting value of the setting item configured via the application software is different from a setting value of the setting item configured via the printer driver.

According to a further aspect of the present invention, there is provided a computer readable medium having computer readable instructions stored thereon, which cause a computer with application software and a printer driver installed thereinto to perform a step of issuing a warning when a setting value of a print setting item, which is configurable via the application software and printer driver, configured via the application software is different from a setting value of the print setting item configured via the printer driver.

According to the above configurations, when a first setting value of a setting item configured via the application software is different from a second setting value of the setting item configured via the printer driver, the user can easily know it.

Hence, it can be prevented that the printing operation is actually performed although the user does not know the setting value of the setting item has been updated via the application software, and wrongly assumes the printing operation will be carried out with the setting values configured via the printer driver. Therefore, the printer can have more improved user-friendliness and convenience.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, embodiments according to aspects of the invention will be described with reference to the accompanying drawings.

(First Embodiment)

1. Overview of Print Control System

Figure 1:
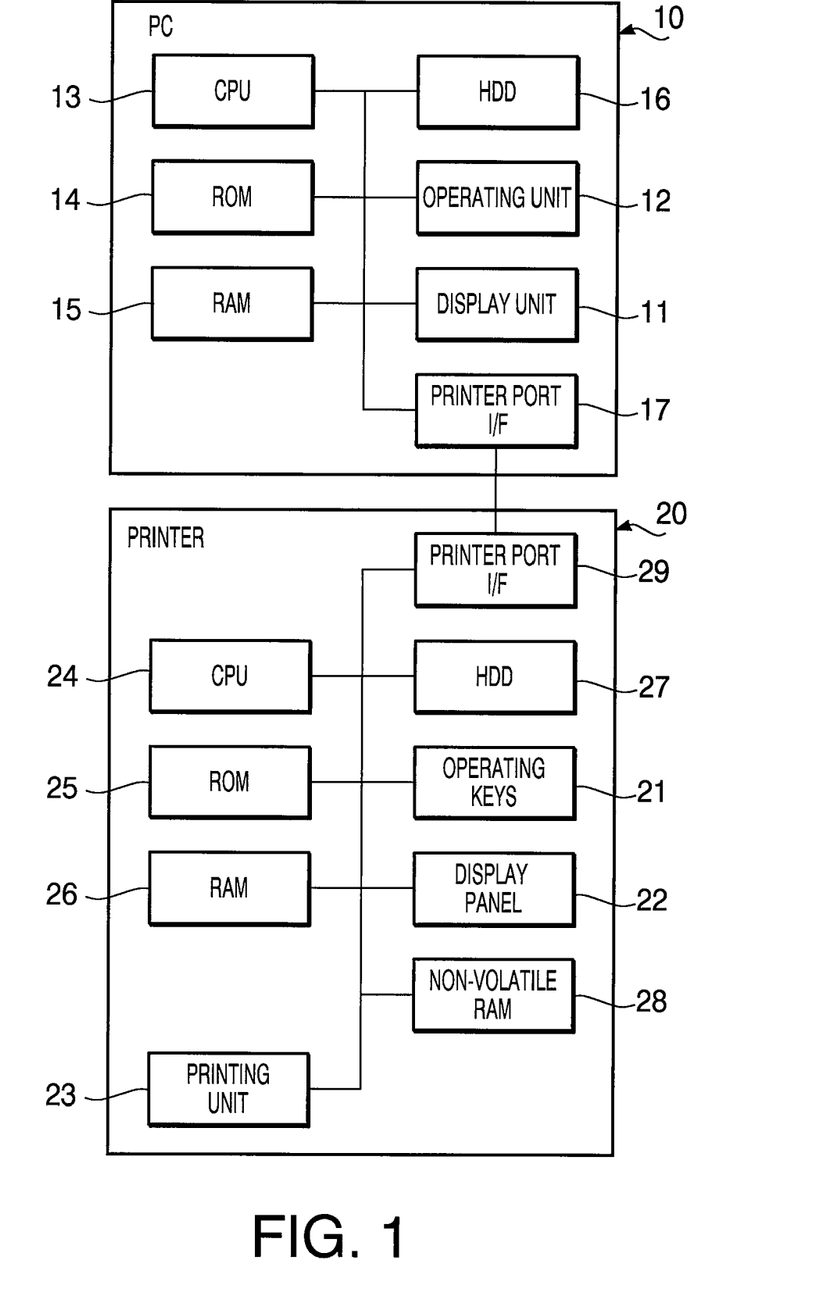
FIG. 1 schematically shows a print control system in accordance with one or more aspects of the present invention.

FIG. 1 schematically shows a print control system according to aspects of the present invention, which is configured with a computer 10 and printer 20. Hereinafter, based on FIG. 1, the print control system according to aspects of the invention will be explained.

A computer 10 (hereinafter, referred to as "PC 10") is an information processing device configured with a display unit 11, operating unit 12, CPU 13, storing units such as a ROM 14, RAM 15, and HDD 16, and printer port interface 17 via which the PC 10 is connected with the printer 20. The display unit 11 is configured with an LCD or CRT that displays images and/or characters thereon. The operating unit 12 is configured with a pointing device such as a mouse that moves a pointer (not shown) indicating a specific position on the display unit 11 and a keyboard (not shown).

In addition, the printer 20 is configured with operating keys 21 for selecting functions to be provided to the printer 20, a display panel 22 that displays a kind and/or working status of a currently-implemented operation, a printing unit 23 that prints characters and/or images on a recording medium such as a printing paper, CPU 24, ROM 25, RAM 26, and HDD 27.

Incidentally, the RAM 28 is a non-volatile memory that can hold recorded data thereon even though electric power supply is blocked. In addition, the printer port interface 29 can directly connect the printer 20 to the PC 10 without connecting them via LAN.

Additionally, the printer 20 (printing unit 23) according to aspects of the invention is a color-electrophotography-type image forming device (color laser printer) configured to form a colored image by transferring a plurality of kinds of toners such as cyan (C), magenta (M), yellow (Y), and black (B) onto the recording medium.

2. Operation of Print Control Program (Print Control System)

A print control program (printer driver) according to aspects of the invention controls the print control system with being installed in the PC 10. Further, as well as the printer driver, application software such as a word processor is installed in the PC 10.

In the present embodiment, Windows (trademark registered) is employed as an OS (Operating System) of the PC 10. Hereinafter, terms not specifically defined will be used as general meanings in Windows.

Figure 2:
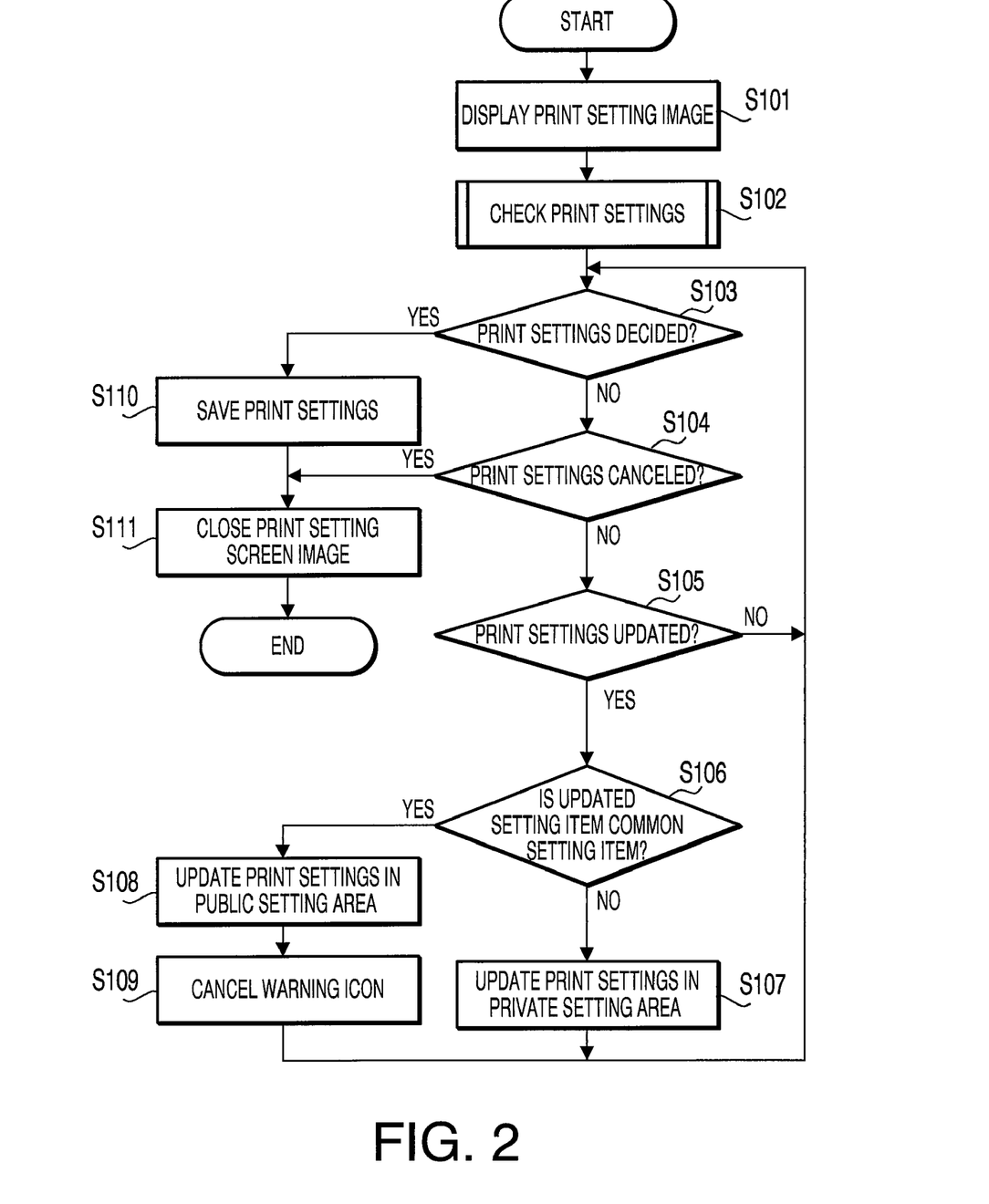
FIG. 2 is a flowchart showing a procedure of a print setting control in embodiments according to one or more aspects of the present invention.
Figure 3:
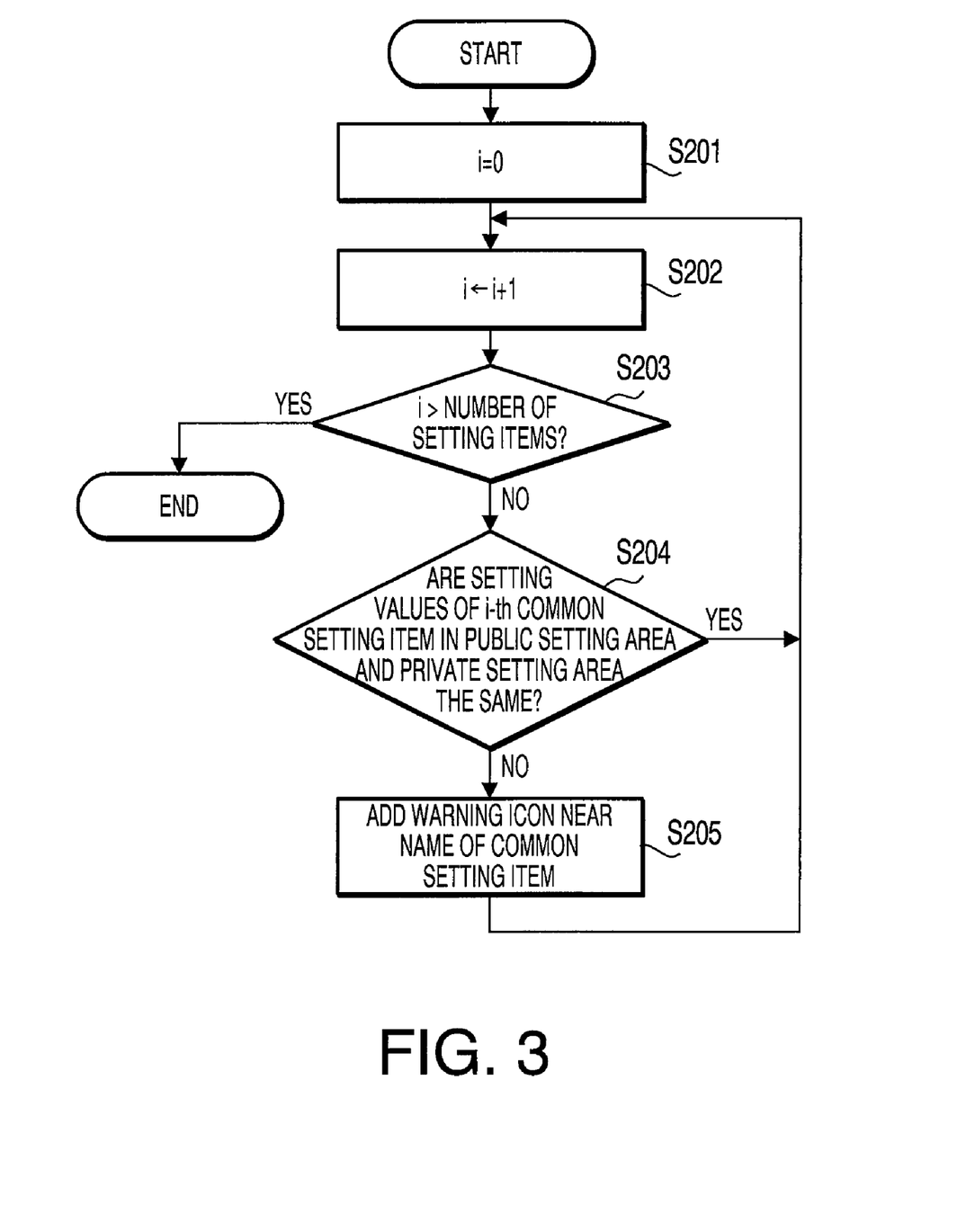
FIG. 3 is a flowchart showing details about a step S102 in FIG. 2.
Figure 4:
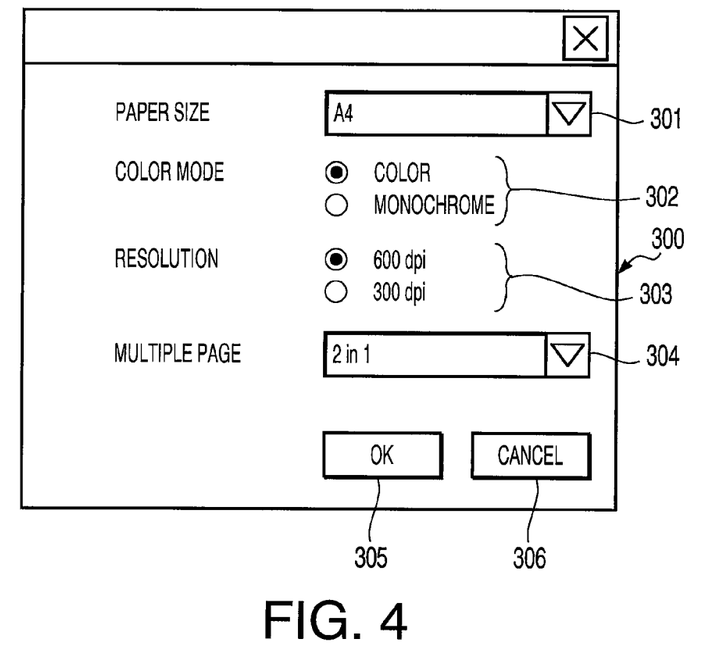
FIGS. 4 and 5 are examples of a print setting screen in a first embodiment according to one or more aspects of the present invention.
Figure 5:
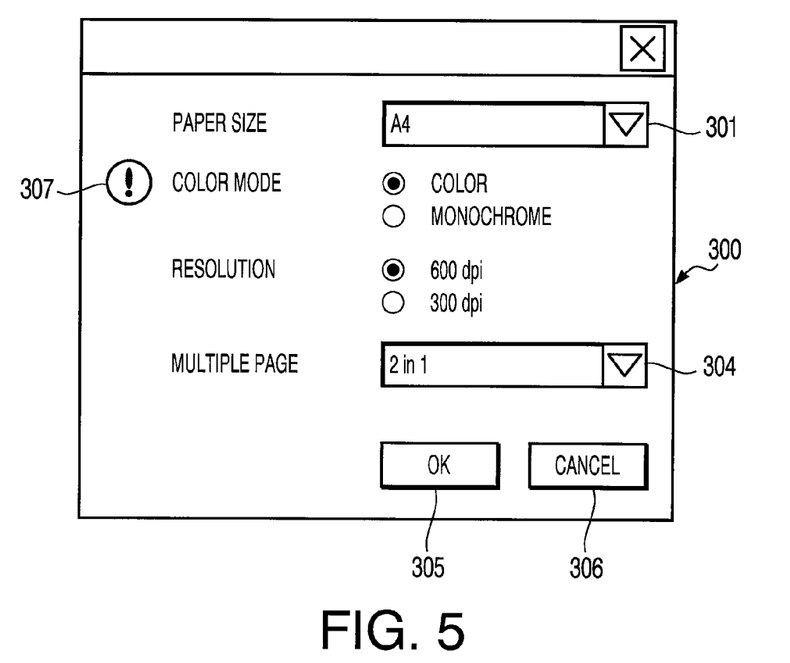
Figure 6:
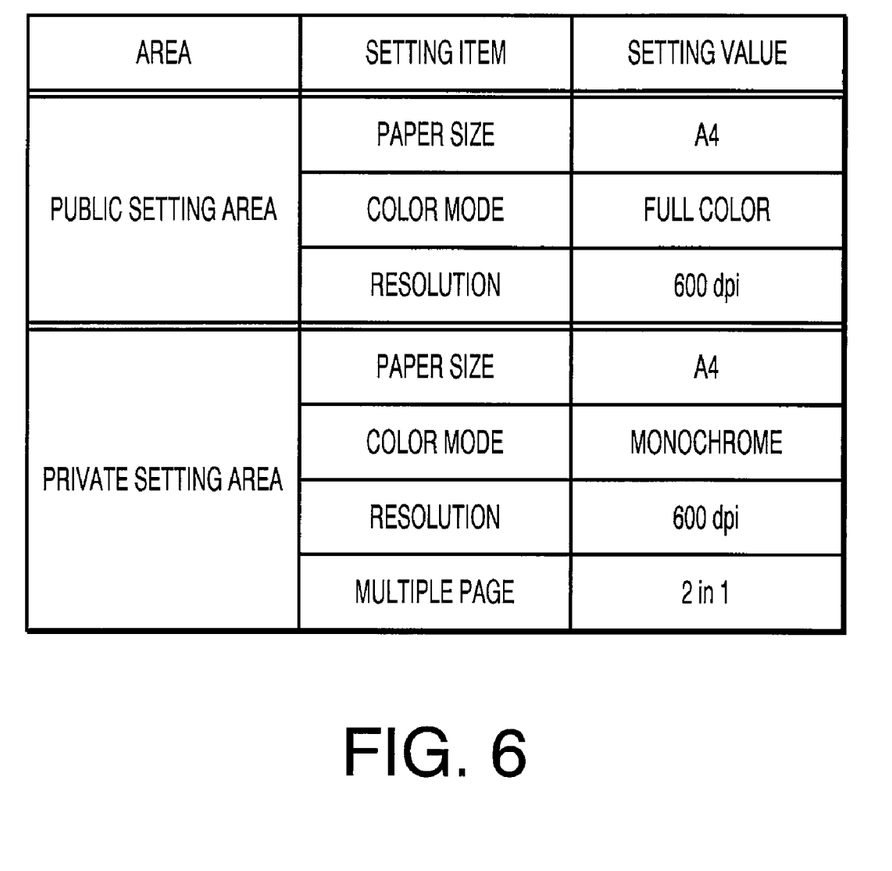
FIG. 6 is a table showing setting values of print setting items in the embodiments according to one or more aspects of the present invention.
Figure 7:
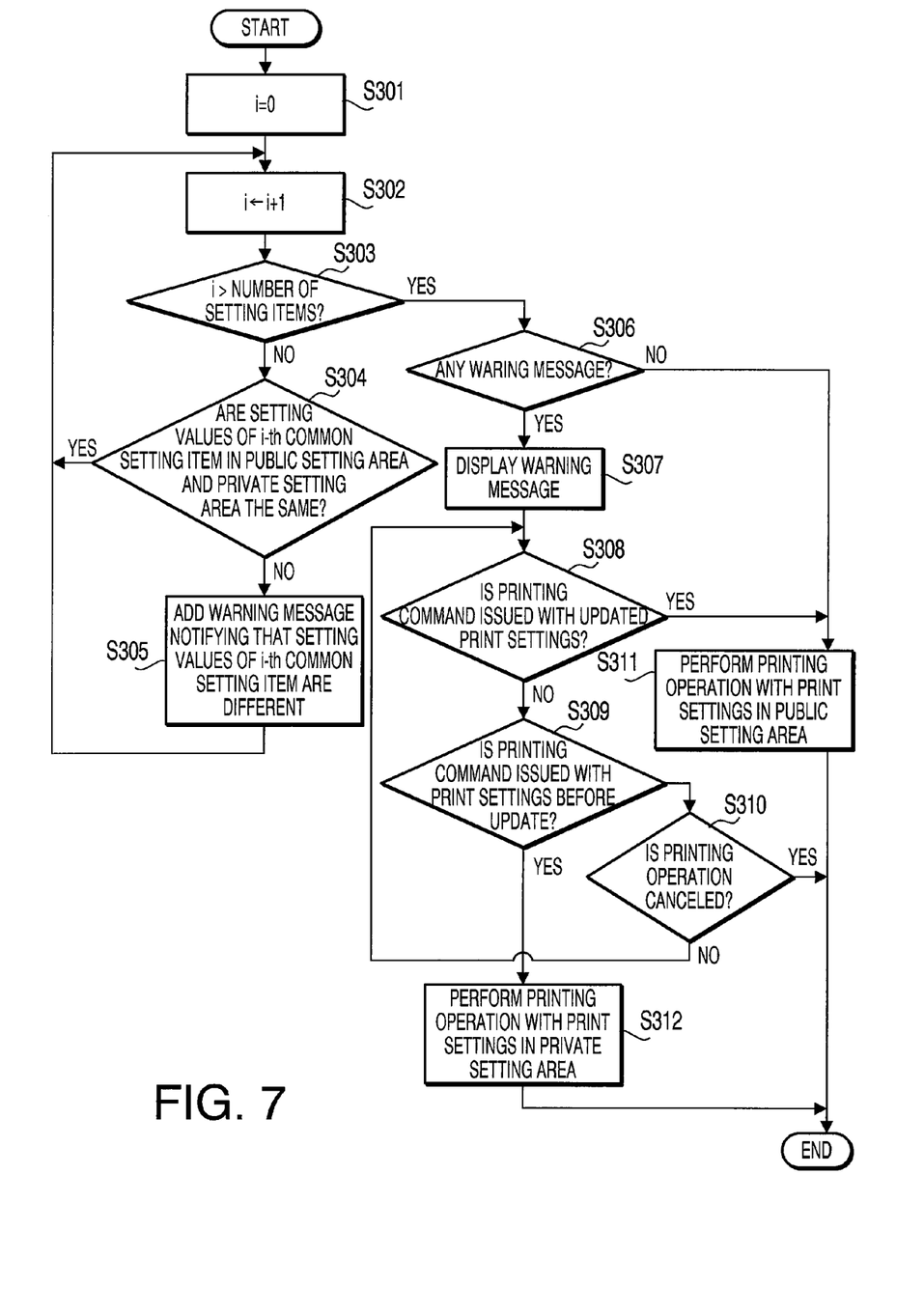
FIG. 7 is a flowchart showing a procedure of operations of a printer driver when a printing command is issued in the embodiments according to one or more aspects of the present invention.
Figure 8:
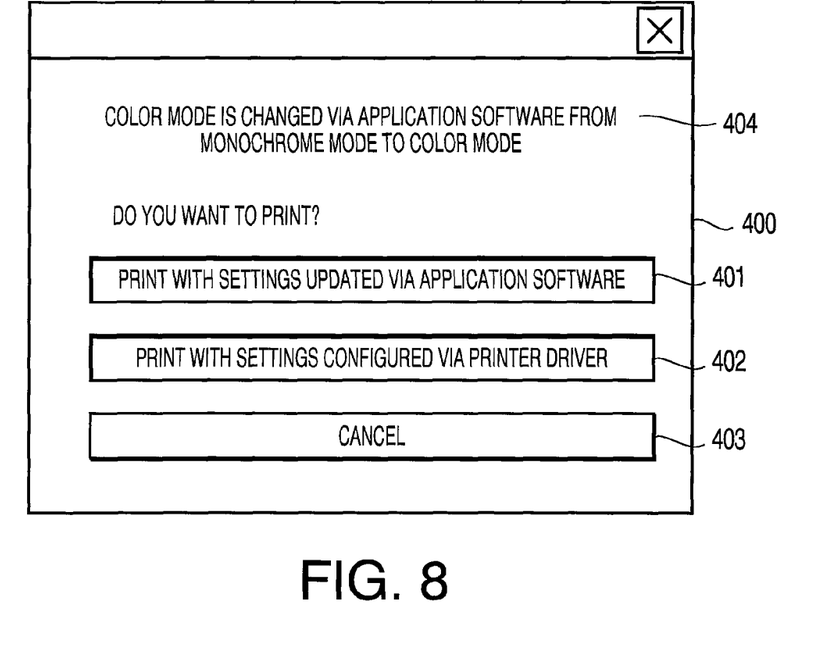
FIG. 8 is an example of a warning screen image in the embodiments according to one or more aspects of the present invention.

FIG. 2 is a flowchart showing a procedure of a print setting control. FIG. 3 is a flowchart showing a detailed procedure of a step S102 in FIG. 2. FIGS. 4 and 5 show examples of a print setting screen 300. FIG. 6 is a table showing contents configured for print setting items. FIG. 7 is a flowchart showing a procedure of operations of the printer driver when a printing command button of the application software is selected and a printing command is issued to the printer 20. FIG. 8 is an example of a warning screen image 400.

2.1. Print Settings and Saving of Configured Settings

The print setting screen (print setting dialog) 300 shown in FIG. 4 is displayed on the display unit 11 when the user selects (clicks) a property of the printer 20. When the user inputs or selects setting items in a state where the print setting screen 300 is opened, the print settings can be configured via the printer driver.

On the print setting screen 300, there are provided as print setting items (hereinafter, simply referred to as "setting items"), a size of the printing paper, color mode in the printing operation, resolution in the printing operation, and the number of pages to be printed on one side of the printing paper such that the user can make input or selection for each of the setting items.

Specifically, a size list box 301 is a list box for selecting the size of the printing paper, in which printable paper sizes such as A4 and B5 have previously been registered. Hence, the user can select a size of a printing paper to be used for the printing operation from the previously registered paper sizes.

A color mode check box 302 is a check box for selecting one of a color printing mode and monochrome printing mode.

A resolution check box 303 is a check box for selecting the resolution in the printing operation. In the present embodiment, the resolution check box 303 is configured to alternatively select one of 600 [dpi] and 300 [dpi]. It is noted that since the density of dots constituting a printing image is higher for higher resolution, the quality of the printing image is generally improved as well for such higher resolution.

A multiple page list box 304 is a list box for selecting the number of pages to be printed on one side of the printing paper, in which numbers of pages printable on one side of the printing paper have previously been registered.

The user can select desired number of pages to be printed on one side of the printing paper from the registered numbers of pages. Incidentally, in FIG. 4, "2 in 1" represents two pages of data are printed on one side of the printing paper.

Further, an "OK" button 305 is a means for deciding the setting items. When the "OK" button 305 is pressed, the settings currently displayed on the print setting screen 300 are saved. In the present embodiment, the settings configured via the print setting screen 300, i.e., printer driver are stored in a private setting area (see FIG. 6) secured on the HDD 16. In addition, the settings configured via the printer driver are also stored in a below-mentioned public setting area (see FIG. 6) secured on the HDD 16.

A "Cancel" button 306 is a means for closing the print setting screen 300 and terminating the print setting without storing the settings configured via the printer driver into the private setting area or public setting area.

Meanwhile, in the present embodiment, the size of the printing paper, color mode in the printing operation, and resolution in the printing operation among the above setting items can be updated as well via a print setting screen of the application software without starting up the print setting screen 300.

Thus, in the present embodiment, the public setting area (see FIG. 6) separate from the private setting area is secured on the HDD 16. The setting items stored in the public setting area can be configured via the print setting screen of the application software as well as the printer driver (print setting screen 300).

Additionally, when setting values of a setting item (hereinafter, referred to as "common setting item") for which memory areas are secured in both the private setting area and public setting area are different from each other, there is issued such a warning that the user can identify which the setting item with the different setting values is.

Specifically, when the print setting screen 300 is started up, as shown in FIG. 5, a warning icon 307 such as an exclamation mark (!) is displayed near the setting item with the different setting values. When the printing command button of the application software is selected, and the printing command is issued to the printer 20, a below-mentioned warning screen image 400 (see FIG. 8) is displayed.

2.2. Print Setting Control (see FIG. 2)

FIG. 2 is a flowchart showing a print setting control booted when the user selects the property of the printer 20. When the print setting control is booted, firstly, the print setting screen 300 (see FIG. 4) is displayed on the display unit 11 (S101), and thereafter it is judged whether there is a common setting item of which setting values (see FIG. 6) stored in the private setting area and public setting area are different from each other (S102). It is noted that a detailed explanation of the step S102 will be given later.

Next, based on whether the "OK" button 305 is pressed, it is judged whether the print settings are decided (S103). When it is not judged that the print settings are decided (S103: No), based on whether the "Cancel" button is pressed, it is judged whether the print settings are canceled (S104).

When it is not judged that the print settings are canceled (S104: No), it is judged whether there is updated at least one of the size of the printing paper, color mode in the printing operation, resolution in the printing operation, and the number of the pages to be printed on one side of the printing paper (S105). When it is judged that there is updated at least one of them (S105: Yes), it is judged whether the updated setting item is included in the common setting items (S106).

At this time, when it is judged that the updated setting item is included in the common setting items (S106: Yes), the value of the updated setting item is provisionally stored in both the private setting area and public setting area (S108). In addition, when the warning icon 307 is displayed with respect to the updated setting item, the warning icon 307 is deleted from on the print setting screen 300 (S109).

It is noted that the "provisionally stored" state represents that the setting value before the update has not yet deleted, and the updated setting value is stored together with the setting value before the update. Namely, the provisionally stored" state represents that the setting valued before the update has not yet been overwritten with the updated setting vale, and the setting value displayed on the print setting screen 300 is only changed.

Meanwhile, when it is not judged that the updated setting item is included in the common setting items, that is, it is judged that the number of the pages to be printed on one side of the printing paper is updated (S106: No), the setting value of the updated setting item is provisionally stored in the private setting area (S107).

Further, when it is judged that the print settings are decided in S103 (S103: Yes), the values of the settings are overwritten with the values displayed on the print setting screen 300 (S110), and thereafter the print setting screen 300 is closed (S111).

In addition, when it is judged that the print settings are canceled (S104: Yes), the print setting screen 300 is closed without the updated setting values provisionally stored being overwritten and saved (S111).

2.3. Comparison Control of Common Setting Items (Details about S102)

FIG. 3 is a flowchart showing a procedure of control for confirming the print settings in S102. When the control is started up, firstly, an initial value (0) is inputted into a parameter i (S201), and thereafter a value obtained by adding 1 to the current parameter i is defined as a new parameter i (S202).

Next, it is judged whether the parameter i is more than the number of the common setting items (S203). When it is not judged that the parameter i is more than the number of the common setting items (S203: No), it is judged whether a setting value of a i-th common setting item stored in the public setting area is equivalent to a setting value of a i-th common setting item stored in the private setting area (S204).

When it is judged that the setting value of the i-th common setting item stored in the public setting area is equivalent to the setting value of the i-th common setting item stored in the private setting area (S204: Yes), a value obtained by adding 1 to the current parameter i is again defined as a new parameter i (S202). Meanwhile, when it is not judged that the setting value of the i-th common setting item stored in the public setting area is equivalent to the setting value of the i-th common setting item stored in the private setting area (S204: No), the warning icon 307 (see FIG. 5) for warning the user is displayed near the i-th common setting item on the print setting screen 300 (S205), and thereafter a value obtained by adding 1 to the current parameter i is again defined as a new parameter i (S202). Then, the steps S203 to S205 are repeated until the parameter i is more than the number of the common setting items.

It is noted that when it is judged that the parameter i is more than the number of the common setting items (S203: Yes), the judgment whether the setting values are equivalent is regarded to be completed with respect to all the common setting items, and the control process is terminated.

2.4. In Case of Printing Command Button of Application Software Pressed

FIG. 7 is a flowchart showing operations of the printer driver booted when the printing command button (not shown) of the application software or "Print" in a file menu is selected, and the printing command is issued from the application software to the printer 20.

When the printer driver is booted, firstly, an initial value (0) is inputted into a parameter i (S301), and thereafter a value obtained by adding 1 to the current parameter i is defined as a new parameter i (S302). Next, it is judged whether the parameter i is more than the number of the common setting items (S303).

At this time, when it is not judged that the parameter i is more than the number of the common setting items (S303: No), it is judged whether a setting value of a i-th common setting item stored in the public setting area is equivalent to a setting value of a i-th common setting item stored in the private setting area (S304).

When it is judged that the setting value of the i-th common setting item stored in the public setting area is equivalent to the setting value of the i-th common setting item stored in the private setting area (S304: Yes), a value obtained by adding 1 to the current parameter i is again defined as a new parameter i (S302). Meanwhile, when it is not judged that the setting value of a i-th common setting item stored in the public setting area is equivalent to the setting value of a i-th common setting item stored in the private setting area (S304: No), there is created a warning message 404 (see FIG. 8) notifying that the setting value of the i-th common setting item configured via the application software is different from the setting value of the i-th common setting item configured via the printer driver, and the warning message 404 is stored in the RAM 15 of the PC 10 (S305). Thereafter, a value obtained by adding 1 to the current parameter i is again defined as a new parameter ii (S302), and the steps S303 to S305 are repeated until the parameter i is more than the number of the common setting items.

Furthermore, when it is judged that the parameter i is more than the number of the common setting items in S303 (S303: Yes), the judgment whether the setting values are equivalent is regarded to be completed with respect to all the common setting items, and it is judged whether the warning message 404 created in S305 is stored in the RAM 15 (S306).

At this time, when it is not judged that the warning message 404 created is stored in the RAM 15 (S306: No), the printing command is issued to the printer 20 with the setting values stored in the public setting area for the common setting items and the setting values stored in the private setting area for the setting items other than the common setting items. Then, a printing job is actually carried out, and the present control process is terminated (S311).

Meanwhile, when it is judged that the warning message 404 created is stored in the RAM 15 (S306: Yes), there is displayed on the display unit 11, the warning screen image 400 (see FIG. 8) including the warning message 404 (S307). Then, it is judged which is selected among a first to third command buttons 401 to 403 (see FIG. 8) displayed on the warning screen image 400 (S308 to S310).

When it is judged that the first command button 401 is selected (S308: Yes), the warning screen image 400 is closed. Concurrently, the printing command is issued to the printer 20 with the setting values stored in the public setting area for the common setting items and the setting values stored in the private setting area for the setting items other than the common setting items. Then, a printing job is actually carried out, and the present control process is terminated (S311).

In addition, when it is judged that the second command button 402 is selected (S308: No, and S309: Yes), the warning screen image 400 is closed. Concurrently, the printing command is issued to the printer 20 with the setting values stored in the private setting area, that is, the setting values configured via the printer driver. Then, a printing job is actually carried out, and the present control process is terminated (S312).

Further, when it is judged that the third command button 403 is selected (S308: No, S309: No, and S310: Yes), the warning screen image 400 is closed. Concurrently, without any printing command being issued and any printing job being carried out, the present control process is terminated. Meanwhile, when it is judged that any command button is not selected (S308: No, S309: No, and S310: No), the present process goes back to S308, and the warning screen image 400 keeps being displayed until any of the first to third command buttons 401 to 403 is selected by the user, performing again the steps S308 to S312.

3. Features of Print Control System According to Aspects of Invention

In the present embodiment, when a setting value of a common setting item stored in the private setting area is different from a setting value of the common setting item stored in the public setting area, the warning informing of it is issued (S205, S307). Accordingly, when a setting value for a setting item configured via the application software is different from a setting value for the same setting item as the item configured via the application software among the setting items configured via the printer driver, the user can easily know it.

Hence, it can be prevented that the printing operation is actually implemented although the user does not know a setting value of a setting item has been updated via the application software, and wrongly assumes the printing operation will be carried out with the the setting values configured via the printer driver. Therefore, the printer can have more improved user-friendliness and convenience.

Additionally, in the present embodiment, the warning is issued (S307) before the printing command is issued from the application software to the printer 20 and the printing job is carried out after the printing command button of the application software or the "Print" in the file menu is selected. Thereby, it is possible to inform the user, who wrongly assumes the printing operation will be carried out with the print settings configured via the printer driver, that the print settings have been updated via the application software, before the printing operation is actually implemented.

Furthermore, it is possible to cancel the printing command (S310) before the printing command is issued from the application software to the printer 20 and the printing job is carried out after the printing command button of the application software or the "Print" in the file menu is selected. Accordingly, it can certainly be prevented that the printing operation is actually carried out although the user does not know the print settings have been updated via the application software.

In addition, the user can select whether to perform the printing job with the setting values stored in the public setting area or the private setting area (S308, S309) before the printing command is issued from the application software to the printer 20 and the printing job is carried out after the printing command button of the application software or the "Print" in the file menu is selected. Accordingly, when the user wishes to perform the printing operation with the setting values configured via the application software, the user can select the setting values configured via the application software such that the printing operation is performed therewith. Meanwhile, when the user wishes to perform the printing operation with the setting values configured via the printer driver, the user can select the setting values configured via the printer driver such that the printing operation is performed therewith. Thus, the printer can have further improved user-friendliness and convenience.

Further, in the present embodiment, when a setting value of a common setting item stored in the private setting area is equivalent to a setting value of the common setting item stored in the public setting area, the warning is canceled (S109, S204, S304). Therefore, when the warning is canceled and not displayed, the setting value of the common setting item configured via the application software is the same as the setting value of the common setting item configured via the printer driver. Hence, the user can easily know it based on whether or not the warning is displayed.

(Second Embodiment)

In the aforementioned embodiment, it is judged whether all the common setting items stored in the public setting area have the same setting values as those of the common setting items stored in the private setting area. Meanwhile, in a second embodiment, the user can select and update common setting items (that is, common setting items as subjects of the warning, hereinafter referred to as "monitored items") to be checked whether the setting values thereof are equivalent between the common setting items stored in the private setting area and the public setting area.

Figure 9:
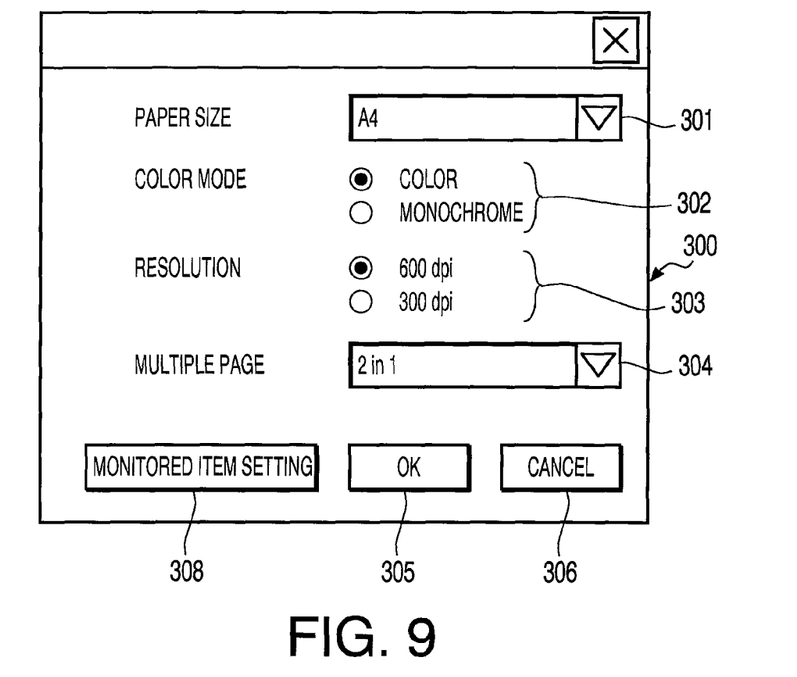
FIG. 9 is an example of a print setting screen in a second embodiment according to one or more aspects of the present invention.
Figure 10:
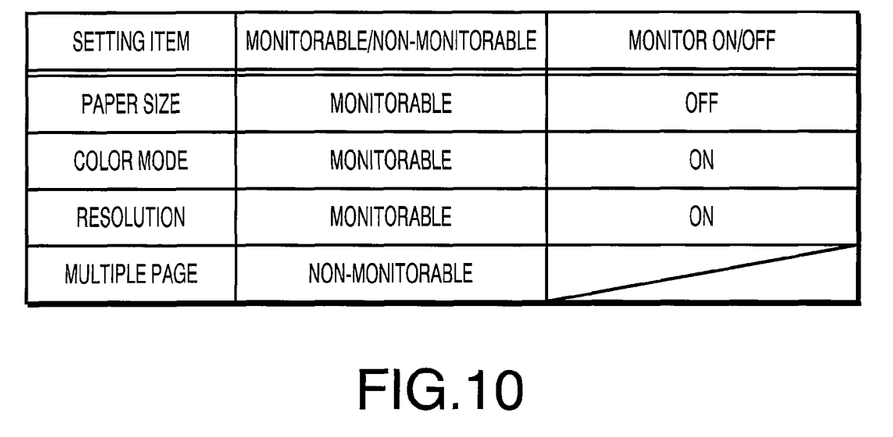
FIG. 10 is a table showing whether or not each setting item is monitorable in the second embodiment according to one or more aspects of the present invention.
Figure 11:
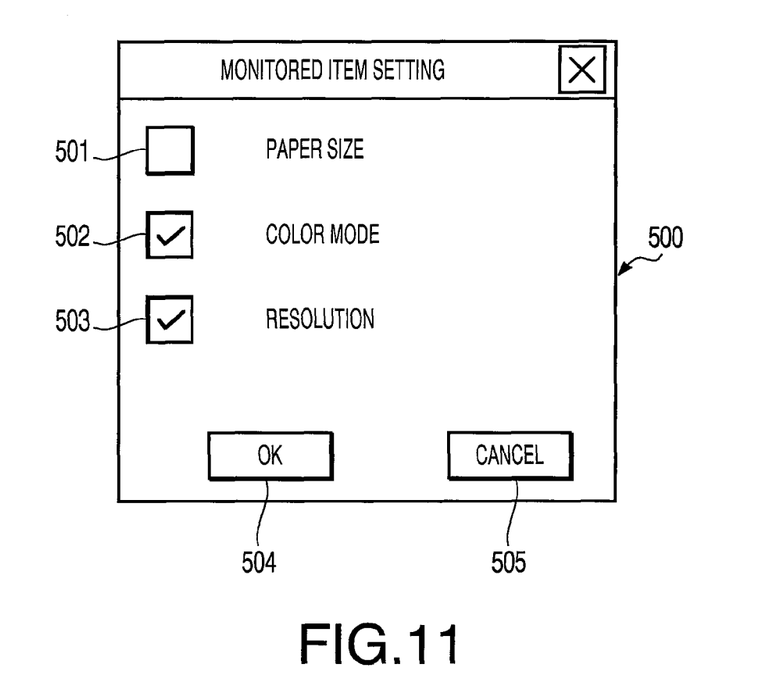
FIG. 11 is an example of a monitored item setting screen displayed when a monitored item setting button is selected in the second embodiment according to one or more aspects of the present invention.

FIG. 9 is an example of a print setting screen 300 according to aspects of the invention. FIG. 10 is a table showing whether or not each of the setting items is monitorable. FIG. 11 is an example of a monitored item setting screen 500 displayed when a monitored item setting button 308 is selected.

In the present embodiment, as shown in FIG. 9, the monitored item setting button 308, with which the user sets the monitored items, is newly provided in the print setting screen 300. When the monitored item setting button 308 is selected, the monitored item setting screen 500 is displayed as shown in FIG. 11.

Further, in the monitored item setting screen 500, there are provided setting items that can be the monitored items (in the present embodiment, the size of the printing paper, color mode in the printing operation, and resolution in the printing operation) and check boxes 501 to 503 for selecting monitored items from the monitored items displayed.

When an "OK" button 504 is selected, setting items currently being selected on the monitored item setting screen 500 are saved as the monitored items, and the monitored item setting screen 500 is closed. In addition, when a "Cancel" button 505 is selected, the monitored item setting screen 500 is closed with setting values previously saved being maintained and no monitored item being updated.

Thereby, in the present embodiment, a setting item that the user does not consider as the subject of the warning can be set as a setting item to which the warning is not issued. Thus, the printer can have further improved user-friendliness and convenience.

(Modifications)

In the aforementioned embodiments, the warning that represents a setting value of a setting item has been updated is displayed on the print setting screen 300 or the warning screen image 400. However, the invention is not limited to the above configurations. The print control system according to aspects of the invention may be configured such that the warning is issued, for example, with sounds and/or vibrations, or that the warning is displayed on a task bar and/or desktop regardless of whether the printer driver is booted or whether the printing command is issued. Further, in the aforementioned embodiments, the warning displayed on the print setting screen 300 is indicated by the exclamation mark (!). However, any display manner such as changing a display color of a setting item to be warned and displaying a warning message may be possible which can make the user recognize that a setting value of a setting item configured via the application software is different from a setting value of the setting item configured via the printer driver.

Additionally, in the above embodiments, when a setting value of a setting item is updated via the printer driver, the updated value is reflected on a corresponding value in the public setting area. However, the invention is not limited to the above configuration. When the setting value of the setting item is changed via the printer driver, only a corresponding value in the private setting area may be updated with the updated value.

Furthermore, in the aforementioned embodiments, all the features according to aspects of the invention are actualized with the printer driver. However, the printer 20 may be provided with a means for actualizing all the features according to aspects of the invention.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A print control system, comprising:
a computer with application software and a printer driver installed thereinto;
a printer, which is connected with the computer, configured to perform a printing operation based on print settings including a plurality of setting items, wherein the plurality of setting items include first setting items configurable via the application software and second setting items configurable via the printer driver, the first setting items and the second setting items having at least one common setting item;
a first storage;
a second storage,
wherein, when the first setting items are configured via the application software, setting values of the first setting items are stored only in the first storage,
wherein, when the second setting items are configured via the printer driver,
setting values of the second setting items are stored in the second storage, and
if the configured ones of the second setting items include the at least one common setting item, the setting value of the at least one common setting item is stored in the first storage and the second storage,
wherein, when the at least one common setting item is configured via the printer driver after the at least one common setting item is configured via the application software, the setting value of the at least one common setting item stored in both of the first storage and the second storage is the setting value of the at least one common setting item configured via the printer driver; and
a warning unit configured to issue a warning when the setting value of the at least one common setting item stored in the first storage does not coincide with the setting value of the at least one common setting item stored in the second storage.

2. The print control system according to claim 1, further comprising a judging unit configured to judge whether the setting values of the at least one common setting item stored in the first storage coincide with the setting values of the at least one common setting item stored in the second storage, wherein the warning unit issues the warning when the judging unit judges that the setting values of the at least one common setting item stored in the first storage do not coincide with the setting values of the at least one common setting item stored in the second storage.

3. The print control system according to claim 1, further comprising a display unit configured to display thereon a setting screen for configuring the print settings, wherein the warning unit displays the warning on the setting screen.

4. The print control system according to claim 1, wherein the warning unit issues the warning before a printing command is issued to the printer.

5. The print control system according to claim 4, further comprising a cancel unit configured to cancel the printing command to be issued to the printer.

6. The print control system according to claim 1, further comprising a selecting unit configured to select one of the setting values of the first setting items and the setting values of the second setting items based on the printing operation to be performed by the printer.

7. The print control system according to claim 2, further comprising a setting unit configured to decide a setting item to be warned by the warning unit when the judging unit judges that the setting values of the at least one common setting item stored in the first storage do not coincide with the setting values of the at least one common setting item stored in the second storage.

8. The print control system according to claim 1, further comprising a cancel unit configured to cancel the warning when a setting value of a common setting item of the first setting items is equivalent to a setting value of a common setting item of the second setting items.

9. A printer configured to be connectable with a computer into which application software and a printer driver are installed, and to perform a printing operation based on print settings including a plurality of setting items configurable via the application software or the printer driver, the printer comprising:

a first storage;
a second storage,
wherein, when the first setting items are configured via the application software, setting values of the first setting items are stored only in the first storage,
wherein, when the second setting items are configured via the printer driver,
setting values of the second setting items are stored in the second storage, and
if the configured ones of the second setting items include the at least one common setting item, the setting value of the at least one common setting item is stored in the first storage and the second storage,
wherein, when the at least one common setting item is configured via the printer driver after the at least one common setting item is configured via the application software, the setting value of the at least one common setting item stored in both of the first storage and the second storage is the setting value of the at least one common setting item configured via the printer driver; and
a warning unit configured to issue a warning when the setting value of the at least one common setting item stored in the first storage does not coincide with the setting value of the at least one common setting item stored in the second storage.

10. The printer according to claim 9, further comprising a judging unit configured to judge whether the setting values of the at least one common setting item stored in the first storage coincide with the setting values of the at least one common setting item stored in the second storage, wherein the warning unit issues the warning when the judging unit judges that the setting values of the at least one common setting item stored in the first storage do not coincide with the setting values of the at least one common setting item stored in the second storage.

11. A non-transitory computer readable medium having computer readable instructions stored thereon that, when executed, cause a computer with application software and a printer driver installed thereon to:

perform a printing operation based on print settings that include a plurality of setting items, wherein the plurality of setting items include first setting items configurable via the application software and second setting items configurable via the printer driver, the first setting items and the second setting items having at least one common setting item;

store setting values of the first setting items only in first storage when the first setting items are configured via the application software;

store setting values of the second setting items in second storage when the second setting items are configured via the printer driver;

store the setting value of the at least one common setting item in the first storage and the second storage if the configured ones of the second setting items include the at least one common setting item, wherein, when the at least one common setting item is configured via the printer driver after the at least one common setting item is configured via the application software, the setting value of the at least one common setting item stored in both of the first storage and the second storage is the setting value of the at least one common setting item configured via the printer driver; and issue a warning when the setting value of the at least one common setting item stored in the first storage does not coincide with the setting value of the at least one common setting item stored in the second storage.

12. The non-transitory computer readable medium according to claim 11, having additional computer readable instructions stored thereon that, when executed, further cause the computer to:

judge whether the setting values of the at least one common setting item stored in the first storage coincide with the setting values of the at least one common setting item stored in the second storage.

* * * * *